(12) United States Patent
Chung et al.

(10) Patent No.: US 12,311,644 B2
(45) Date of Patent: May 27, 2025

(54) STRETCHABLE SUBSTRATE HAVING IMPROVED STRETCHING DEFORMATION UNIFORMITY THROUGH CONTROL OF SPATIAL CROSSLINKING DEGREE AND METHOD OF MANUFACTURING THE SAME

(71) Applicant: Korea Institute of Science and Technology, Seoul (KR)

(72) Inventors: Seungjun Chung, Seoul (KR); Jun Chan Choi, Seoul (KR); Hoon Yeub Jeong, Seoul (KR); Jeong Gon Son, Seoul (KR); Heesuk Kim, Seoul (KR); Phillip Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 60 days.

(21) Appl. No.: 18/467,594

(22) Filed: Sep. 14, 2023

(65) Prior Publication Data

US 2025/0026101 A1 Jan. 23, 2025

(30) Foreign Application Priority Data

Jul. 21, 2023 (KR) .................. 10-2023-0094972

(51) Int. Cl.
*B32B 3/12* (2006.01)
*B32B 7/022* (2019.01)
*B32B 37/14* (2006.01)

(52) U.S. Cl.
CPC ................ *B32B 3/12* (2013.01); *B32B 7/022* (2019.01); *B32B 37/146* (2013.01); *B32B 2307/51* (2013.01); *B32B 2307/54* (2013.01); *B32B 2310/0806* (2013.01); *B32B 2457/00* (2013.01)

(58) Field of Classification Search
None
See application file for complete search history.

(56) References Cited

FOREIGN PATENT DOCUMENTS

| KR | 10-1749861 B1 | 6/2017 |
| KR | 2279067 B1 * | 7/2021 |

OTHER PUBLICATIONS

Machine translation from EPO of KR102279067B1, translated Jan. 7, 2025. (Year: 2021).*

* cited by examiner

*Primary Examiner* — Elizabeth Collister
(74) *Attorney, Agent, or Firm* — Studebaker Brackett PLLC

(57) ABSTRACT

Provided is a method of manufacturing a stretchable substrate having improved stretching deformation uniformity through control of a spatial crosslinking degree according to various embodiments of the present disclosure to implement the above object. The method includes forming a substrate part of an elastic material, forming an auxetic including a plurality of unit structures on the substrate part, and forming a fixing part on the substrate part on which the auxetic is formed, wherein the fixing part has a different crosslinking density in each region.

14 Claims, 12 Drawing Sheets

STRETCHABLE SUBSTRATE HAVING IMPROVED STRETCHING DEFORMATION UNIFORMITY THROUGH CONTROL OF SPATIAL CROSSLINKING DEGREE AND METHOD OF MANUFACTURING THE SAME

CROSS-REFERENCE TO RELATED APPLICATION

This application claims priority to and the benefit of Korean Patent Application No. 2023-0094972, filed on Jul. 21, 2023, the disclosure of which is incorporated herein by reference in its entirety.

BACKGROUND

1. Field of the Invention

The present disclosure relates to a stretchable substrate into which a mechanical metamaterial having an auxetic structure is introduced, and more particularly, to a stretchable substrate in which a crosslinking degree of a matrix is differently controlled for each region to reduce a deviation in induced stress generated during stretching of a substrate and cause uniform stretching deformation, and a method of manufacturing the same.

2. Discussion of Related Art

In recent years, beyond conductive elements in which electrodes are formed on a rigid substrate, research and development has been actively conducted on stretchable electronic elements in which electrodes are formed on a flexible substrate. Stretchable electronic elements are electronic elements that are manufactured on a substrate that is freely stretchable in response to external stress and are next-generation electronic elements that maintain the electrical/physical properties of an element even when mechanical deformation occurs or external force is applied. Such stretchable electronic elements may be applied to flexible devices, wearable devices, or the like, and furthermore, may be used as displays or sensors or electrodes attached to the human body.

Stretchable electronic elements may be most widely used in fields such as stretchable displays, stretchable solar cells, and stretchable energy storage/power generation devices. The stretchable electronic elements are showing potential as a next-generation technology following flexible displays. In addition, the stretchable electronic elements not only increase a degree of freedom in design due to excellent mechanical variability thereof but also secure mechanical stability against an external force, and are therefore expanding to markets such as wearable devices, electronic skin, smartphones, medical devices, healthcare monitoring systems, defense, and aerospace.

For a specific example, the field of displays is developing in a direction of increasing degrees of freedom of deformation, fixed flat/curved displays to flexible, foldable, or rollable displays that are foldable or rollable in a single direction. Recently, as electronic devices have become smart and spatial mobility thereof has been emphasized more, there has arisen a need to leave behind fixed displays and develop a stretchable display that is deformable in multidimensional axis directions under various conditions and freely usable.

As described above, with the advancement of technology related to the field of stretchable displays, the implementation of new digital interfaces beyond existing methods is expected to become possible. For example, a stretchable display may be implemented through an elastic substrate which has a negative Poisson's ratio, that is, of which, when stretched in one axial direction, a strain in another axial direction is controllable.

However, in such a stretchable display, a negative Poisson's ratio may be controlled in the overall aspect of a substrate, but stress may be nonuniform for each pixel section. Specifically, when a stretchable substrate using an auxetic structure is stretched based on an external stress application point, the stretchable substrate may have a different stress distribution at each position due to a shape of each unit structure constituting an auxetic.

That is, since nonuniform induced stress is distributed at each position, when a substrate is stretched, a deformation deviation may be different for each region, which may cause nonuniform deformation of a structure. In other words, when a substrate is stretched, stress with a different magnitude may be induced at each position due to a stress tailoring effect. For example, under the same external stress condition, stress with a smaller magnitude is induced in a direction away from a stretching point, which is influenced by the stretching point and the area of a substrate or the mechanical properties of a stretchable material. This may cause a difference in a degree of structural deformation, may hinder a Poisson's ratio control effect, and may cause image distortion problems in a variable type display, in particular, a large-area display.

Therefore, in the art, there may be a demand for research and development on a method of improving an induced stress deviation through control of a spatial crosslinking degree of a matrix to control uniform stretching deformation when a stretchable substrate having a negative Poisson's ratio is provided.

RELATED ART DOCUMENTS

Patent Documents

Korean Registered Patent Publication No. 10-1749861 (Jun. 15, 2017)

SUMMARY OF THE INVENTION

The present disclosure is directed to providing a stretchable substrate in which a crosslinking degree of a matrix is controlled differently for each region to reduce a deviation in induced stress generated during stretching of a substrate and cause uniform stretching deformation, and a method of manufacturing the same.

The technical objects of the present disclosure are not limited to those described above, and other undescribed technical objects will become apparent to those skilled in the art from the following description.

According to an aspect of the present invention, there is provided a method of manufacturing a stretchable substrate having improved stretching deformation uniformity through control of a spatial crosslinking degree, the method including forming a substrate part of an elastic material, forming an auxetic including a plurality of unit structures on the substrate part, and forming a fixing part on the substrate part on which the auxetic is formed, wherein the fixing part has a different crosslinking density in each region.

The auxetic may be provided to have a Young's modulus that is higher than a Young's modulus of the substrate part and a Young's modulus of the fixing part.

The forming of the fixing part may include coating the substrate part, on which the auxetic is formed, with a filler in a liquid state, and performing curing.

The filler may include a photocurable elastomer, and the curing may be performed through a different light irradiation pattern for each region.

The filler may include a thermosetting elastomer, the forming of the fixing part may include providing a light absorption pattern layer in an upward direction from the substrate part, the light absorption pattern layer may have a different light absorption pattern for each region, and the curing may include photocuring through uniform light radiation.

The light absorption pattern layer may have a light absorption pattern in which light absorption increases in a direction away from a center.

The forming of the fixing part may include providing a plurality of light absorption structures each corresponding to one of a plurality of regions of the filler in the liquid state, and radiating light through a different irradiation pattern for each region from above the filler including the plurality of light absorption structures, wherein each of the plurality of light absorption structures is provided to correspond to one region and absorb the light.

The filler may include a thermosetting elastomer, the forming of the fixing part may include providing a heat absorption pattern layer on one surface of the substrate part, and providing a heating plate on another surface of the substrate part to supply heat, wherein the heat absorption pattern layer has a different heat absorption pattern for each region, and the curing includes thermal curing performed through supply of heat.

According to another aspect of the present invention, there is provided a stretchable substrate having improved stretching deformation uniformity through control of a spatial crosslinking degree, the stretchable substrate including a substrate part made of an elastic material, an auxetic including a plurality of unit structures and formed on one surface of the substrate part, and a fixing part configured to fix the auxetic, wherein the fixing part has a different crosslinking density in each region.

The auxetic may be provided to have a Young's modulus that is higher than a Young's modulus of the substrate part and a Young's modulus of the fixing part.

The fixing part may be formed by coating the substrate part, on which the auxetic is formed, with a filler in a liquid state, and performing curing.

The filler may include a photocurable elastomer, and the curing may be performed through a different light irradiation pattern for each region.

The filler may include a thermosetting elastomer, the fixing part may be formed by curing the filler by radiating uniform light in a state in which a light absorption pattern layer is provided in an upward direction from the substrate part, and the light absorption pattern layer may have a different light absorption pattern for each region.

The light absorption pattern layer may have a light absorption pattern in which light absorption increases in a direction away from a center.

The fixing part may be formed by radiating light having a different irradiation pattern for each region from above a filler in a liquid state including a plurality of light absorption structures corresponding to each of a plurality of regions, and each of the plurality of light absorption structures may be provided to correspond to one region and absorb the light.

The filler may include a thermosetting elastomer, in a state in which a heat absorption pattern layer is disposed to correspond to a first surface of the fixing part, heat may be supplied through a heating plate disposed to correspond to a second surface of the substrate part to perform thermal curing and form the fixing part, and the heat absorption pattern layer may have a different heat absorption pattern for each region.

Other concrete matters of the present disclosure are included in the detailed description and drawings of the specification.

BRIEF DESCRIPTION OF THE DRAWINGS

Now, various aspects will be described with reference to the accompanying drawings in which like reference numerals collectively designate like elements. In the following embodiments, for the purpose of description, various specific details are suggested to provide overall understanding of one or more aspects. However, it is obvious that the aspects may be embodied without the specific details.

DETAILED DESCRIPTION OF EXEMPLARY EMBODIMENTS

Figure 1:
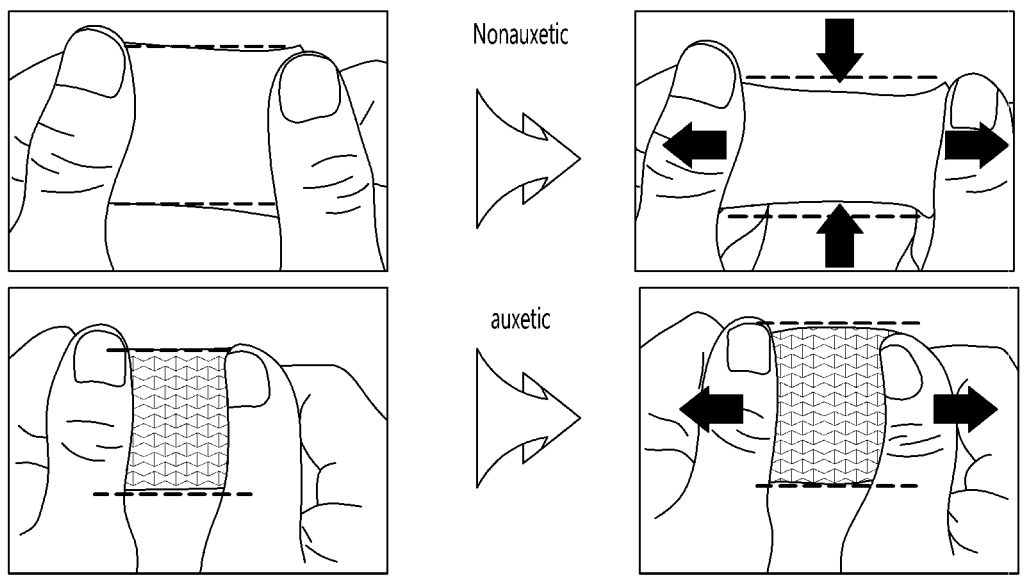
FIG. 1 shows exemplary diagrams illustrating an auxetic structure and a non-auxetic structure according to one embodiment of the present disclosure.

Various embodiments and/or aspects will be disclosed with reference to the accompanying drawings. In the following description, for the purpose of description, various specific details are disclosed to provide overall understanding of one or more aspects. However, those skilled in the art may understand that the aspect(s) may be embodied without having the specific details. The following description and accompanying drawings thoroughly describe specific exemplary aspects of one or more aspects. However, the aspects are provided for an illustrative purpose, some of various methods in principles of the various aspects may be used, and the descriptions are intended to include all of the aspects and equivalents thereof. Specifically, the terms "embodiment," "example," "aspect," "illustration," and the like used in the present specification may not be interpreted as a described arbitrary aspect or design being better than or more advantageous than other aspects or designs.

Hereinafter, in the drawings, the same or similar elements are denoted by the same reference numerals even when they are depicted in different drawings, and a detailed description of the same or similar elements will be omitted. In addition, in the following description of the embodiments disclosed herein, a detailed description of related arts will be omitted when it is determined that the gist of the embodiments disclosed herein may be obscured. Also, the accompanying drawings are used to help easily understand the embodiments disclosed herein, and it should be understood that the technical ideas disclosed herein are not limited by the accompanying drawings.

It will be understood that, although the terms "first," "second," etc. may be used herein to describe various elements or components, these elements or components should not be limited by these terms. These terms are only used to distinguish one element or component from another element or component. Thus, a first element or component discussed below could be termed a second element or component without departing from the technical idea of the present disclosure.

Unless otherwise defined, all terms (including technical and scientific terms) used in the present specification may be used with the same meaning which may be commonly understood by a person with ordinary skill in the art to which the present disclosure belongs. It will be further understood that terms defined in commonly used dictionaries should not be interpreted in an idealized or excessive sense unless expressly and specifically defined.

Further, the term "or" is intended to mean not exclusive "or" but inclusive "or." That is, when it is not specifically designated or unclear in the context, "X uses A or B" is intended to refer to one of natural inclusive substitutions. In other words, "X uses A or B" may apply to any case of "X uses A," "X uses B," or "X uses both A and B." Further, it should be understood that the term "and/or" used in the present specification indicates and includes all possible combinations of one or more items among related listed items.

It should be understood that the term "comprise" and/or "comprising" means existence of the corresponding feature and/or element but does not exclude the existence or addition of one or more other features, elements, and a group thereof. In addition, when not separately defined or not clear in terms of the context that a singular form is indicated, it should be construed that the singular form generally means "one or more" in the present specification and the claims.

It will be understood that when a first element is referred to as being "connected" or "coupled" to a second element, it can be directly connected or coupled to the second element or intervening elements may be present. In contrast, when an element is referred to as being "directly connected" or "directly coupled" to another element, there are no intervening elements present.

In addition, a suffix "module," "unit," or "portion" of an element used herein is assigned or incorporated for convenience of specification description, and the suffix itself does not have a distinguished meaning or function.

It will be understood that when a first element or layer is referred to as being "on" or "above" a second element or layer, the first element or layer can be directly on or above the second element or layer or intervening elements or layers may be present. In contrast, when an element is referred to as being "directly on" or "directly above," there are no intervening elements or layers.

Spatially relative terms, such as "below," "beneath," "lower," "above," "upper," and the like, may be used herein for ease of description to describe one element or feature's relationship to another element(s) or feature(s) as illustrated in the drawings. It will be understood that the spatially relative terms are intended to encompass different orientations of the device in use or in operation, in addition to the orientation depicted in the figures.

For example, when the device in the figures is turned over, elements described as "below," "beneath" or "under" other elements or features would then be oriented "above" the other elements or features. Thus, the exemplary term "below" can encompass both an orientation of above and below. Since an element may be oriented in another direction, the spatially relative terms may be interpreted in accordance with the orientation of the element.

The objects and effects of the present disclosure and technical solutions for accomplishing these may be apparent with reference to embodiments to be described below in detail along with the accompanying drawings. In the description of the present disclosure, detailed descriptions of known functions or configurations will be omitted lest they should obscure the subject matter of the present disclosure. The terms as set forth herein are defined in consideration of the functions of the present disclosure and may vary according to customs or the intent of a user and an operator.

However, the present disclosure is not limited to the embodiments set forth below and may be embodied in various other forms. The present embodiments may be provided to make the present disclosure complete and to enable a person skilled in the art to fully understand the category of the present disclosure. The present disclosure may be defined only by the category described in the appended claims. Thus, the definition may be made based on the entirety of the description of the present specification.

A stretchable substrate 100 (hereinafter referred to as "stretchable substrate") having improved stretching deformation uniformity through control of a spatial crosslinking degree according to the present disclosure may have a negative Poisson's ratio and may include an auxetic 20 formed through a plurality of unit structures. The auxetic 20 may be a mechanical metamaterial that did not previously exist having a mechanism for exhibiting a new mechanical function through a plurality of unit structures. For example, the auxetic 20 related to the mechanical metamaterial may have a structure that expands in a vertical direction unlike typical stretching in nature.

Specifically, the auxetic 20 included in the stretchable substrate 100 may include the plurality of unit structures. In this case, since each unit structure is provided through a specific shape, the auxetic 20 may have a negative Poisson's ratio. A Poisson's ratio may be a ratio of transverse strain to longitudinal strain when a tensile force is applied to a material to stretch the material in a specific direction. In other words, the Poisson's ratio may be a strain of a transverse direction versus a longitudinal direction.

Most materials have a positive Poisson's ratio because a strain in a stretching direction and a strain in a lateral direction of a material have different signs when a tensile force is applied along a single axis. However, when a material is designed to form a specific lattice structure, a negative Poisson's ratio can be realized macroscopically even when a structural material has a positive Poisson's ratio.

For a specific example, referring to FIG. 1, in a material having a general non-auxetic structure, when stress is applied in a transverse direction, the material expands in the transverse direction and contracts in a longitudinal direction at the same time. That is, a Poisson's ratio between longitudinal deformation and transverse deformation to a vertical stress generated inside the material may be positive.

On the other hand, in a material having an auxetic structure, when stress is applied in a transverse direction, the material may expand in both transverse and longitudinal directions. That is, a Poisson's ratio due to a vertical stress generated inside the material may be negative.

According to one embodiment of the present disclosure, the stretchable substrate 100 may include a substrate part 10 on which the auxetic 20 is formed. The substrate part 10 included in the stretchable substrate 100 may be provided to support the auxetic 20 in a process of forming the auxetic 20 and may be provided in the shape of a thin film. In addition, the substrate part 10 may be made of an elastic material having an elastic force. For example, the substrate part 10 may be made of an elastic material such as polydimethylsiloxane (PDMS), thermoplastic polyurethane (TPU), VHB™ tape, or butyl rubber which has an elastic modulus that is greater than or equal to a preset reference value. The detailed description of the above-described substrate part is merely an example, and the present disclosure is not limited thereto.

The auxetic 20 may be provided on one surface of the substrate part 10. In the present disclosure, the provision of the auxetic 20 on one surface of the substrate part 10 may include fixing the auxetic 20 to the one surface of the substrate part 10 after separately manufacturing the substrate part 10 and the auxetic 20 or forming the auxetic 20 on the one surface of the substrate part 10 in a process of forming the substrate part 10. For example, the auxetic 20 may be provided on an upper portion of the substrate part 10 by performing a printing process on the upper portion of the substrate part 10 through an elastic material in a liquid state and then performing curing under specific curing conditions. By using the substrate part 10 as a support, a plurality of unit structures having a specific shape may be formed at the upper portion through a printing process using an elastic material, thereby forming the auxetic 20. The detailed description of the above-described process of providing the auxetic is merely an example, and the present disclosure is not limited thereto.

The printing process in the present disclosure may be a process of printing a target object with a designed circuit pattern through an inkjet printer, a laminator, or the like and may be a roll-to-roll process of forming (or stacking) a specific lattice structure (that is, a plurality of unit structures having a specific shape) through a stretchable or elastic material. Such a printing process may be a process using a device such as an inkjet device, a pneumatic dispenser, a screw dispenser, a screen printing device, a bar coater, or a spray printing device. The detailed description of the devices used in the above-described printing process is merely an example, and the present disclosure is not limited thereto.

That is, the auxetic 20 may be formed on the stretchable substrate 100 through a printing process using an elastic material. Through the printing process, it may be possible to form the auxetic corresponding to an interval and size of several tens to several hundreds of microns. Thus, it is possible to provide a high degree of freedom in design and a high degree of freedom in material and concurrently provide high efficiency in a large-area process.

As described above, unlike general materials, the auxetic 20 of the present disclosure may be a material that has a negative Poisson's ratio, that is, one that is designed such that a transverse strain and a longitudinal strain have the same sign. In other words, the stretchable substrate 100 of the present disclosure is formed through the auxetic 20 which is a mechanical metamaterial designed in a specific lattice structure, thereby controlling a negative Poisson's ratio or a strain in a direction perpendicular to a stretching direction. The Poisson's ratio is an inherent characteristic of a material but can be controlled by forming a specific structure in the material According to an embodiment, the auxetic of the present disclosure may relate to a re-entrant structure. As an example, as shown in FIGS. 1 to 5, the auxetic may be formed through a plurality of unit structures having a re-entrant shape.

Figure 2:
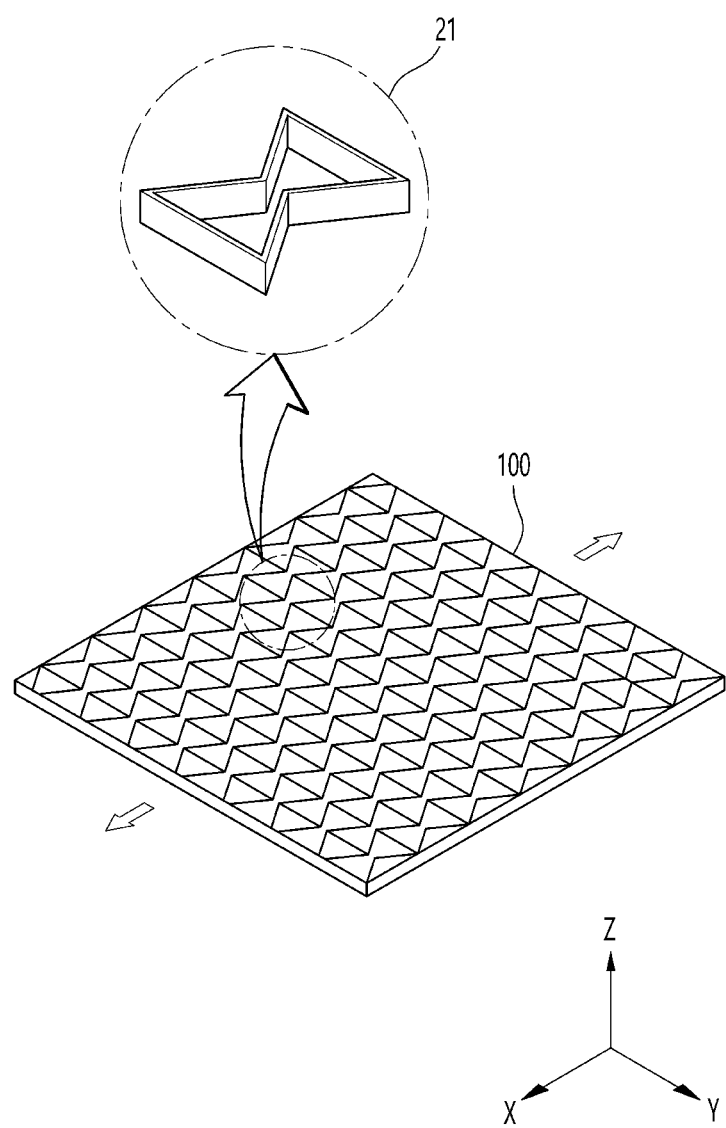
FIG. 2 is an exemplary diagram illustrating a re-entrant auxetic structure according to one embodiment of the present disclosure.

For example, when the auxetic 20 is provided through a re-entrant structure, each of the plurality of unit structures may have a bowtie shape as shown in FIG. 2. When an external force is applied to the auxetic 20 in a longitudinal direction (that is, when the auxetic is stretched in one direction), as each of the plurality of unit structures unfolds, internal stress may act in a transverse direction, and thus the auxetic 20 may have a negative Poisson's ratio. In response to an external force along a longitudinal axis, the auxetic 20 may be stretched along a transverse axis. In other words, in the auxetic 20, since each of the plurality of unit structures provided therein is implemented through a bowtie shape, when an external force is applied along an axis in one direction, a strain along an axis in another direction may be controlled.

That is, the stretchable substrate 100 implemented through the auxetic 20 may be a substrate to which unique mechanical properties that do not exist in nature are given by using a new structure. The stretchable substrate 100 may have high applicability in various fields. For example, the stretchable substrate 100 of the present disclosure may be applied to a flexible device, a wearable device, or the like and used to maintain electrical or physical properties of an element against external stress. For another example, when the stretchable substrate 100 of the present disclosure is used in the field of displays, the stretchable substrate 100 may support deformation in multidimensional axis directions under various conditions, breaking away from fixed displays that fold or roll in a single direction. Thus, higher variability may be provided to improve a degree of freedom in design and also secure mechanical stability against an external force.

Figure 3:
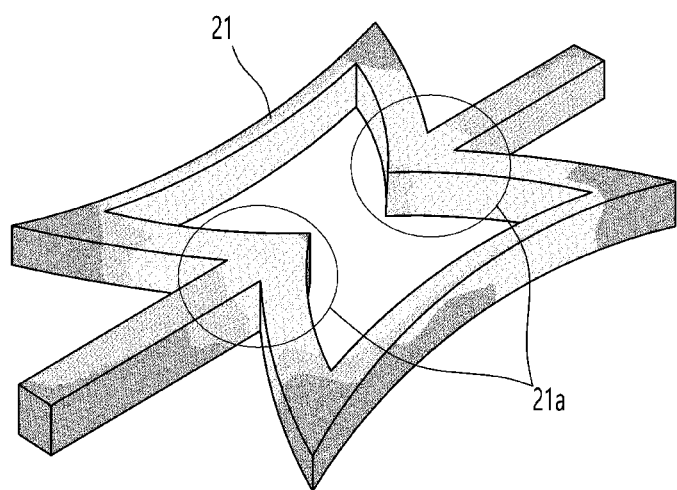
FIG. 3 is an exemplary diagram illustrating nonuniform stress being applied to a unit structure according to one embodiment of the present disclosure.

In the stretchable substrate 100, a negative Poisson's ratio may be controlled in terms of the entire substrate, but during stretching, stress generated in each region may be nonuniform. Referring to FIG. 3, a tensile force applied to each region of a unit structure during stretching may be different. That is, stress applied to an entire substrate formed through a plurality of unit structures may not be uniform. Specifically, angular momentum applied to an auxetic structure may depend on a re-entrant angle (for example, a connection angle in each unit structure). In an embodiment, as a substrate is stretched, an included angle of a structure may increase, and accordingly, greater external stress may be required for a change of an auxetic. In this case, a phenomenon may occur in which stress is concentrated in an intersection region 21a in which three sides of each unit structure intersect each other. In other words, when external stress is applied for stretching, more force may be applied to the intersection region 21a in which three sides of each unit structure intersect each other. As described above, when stress is concentrated in a specific region, it may cause a phenomenon in which a structure is fractured and delaminated.

In addition, as shown in FIG. 2, the stretchable substrate 100 of the present disclosure may include the auxetic 20 including the plurality of unit structures. In this case, different induced stress may be distributed to each position of the unit structures, and thus nonuniform deformation of the structure may occur.

Figure 4:
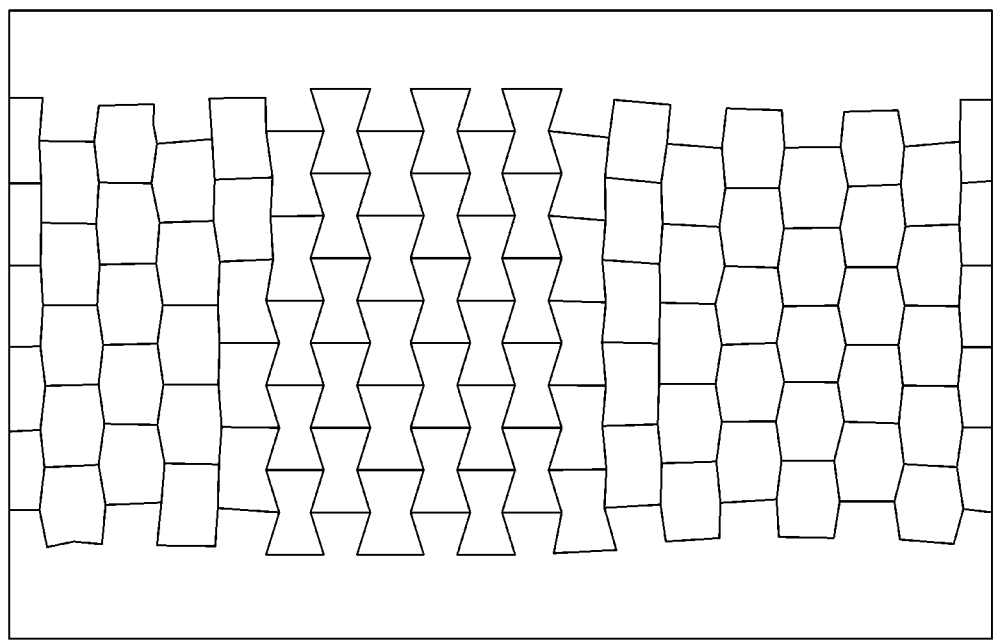
FIG. 4 is an exemplary diagram illustrating a different stress distribution occurring for each region when a substrate is stretched.

More specifically, as shown in FIG. 4, nonuniform stress may be applied to each unit structure according to a position thereof on a substrate at which the unit structure is provided. For example, when an external force for stretching is applied, unit structures positioned at an edge are easily stretched, but unit structures positioned at a central portion may not completely receive a force to thus be less easily stretched. That is, as shown in FIG. 4, both end edges may be stretched because unit structures present at corresponding positions unfold, but the central portion may not be stretched because unit structures present at corresponding positions do not unfold. When both end portions of the substrate are held and stretched, stress transferred to each position of the unit structures may be different, and thus a degree of unfolding may be different for each unit structure.

In other words, since induced stress is nonuniform among regions of the substrate, stretching may also be nonuniformly generated. That is, stress with a different magnitude is induced at each position due to a stress tailoring effect. Under the same external stress condition, stress with a smaller magnitude is induced in a direction away from a stretching point, which is influenced by the stretching point and an area of the substrate or mechanical properties.

Figure 5:
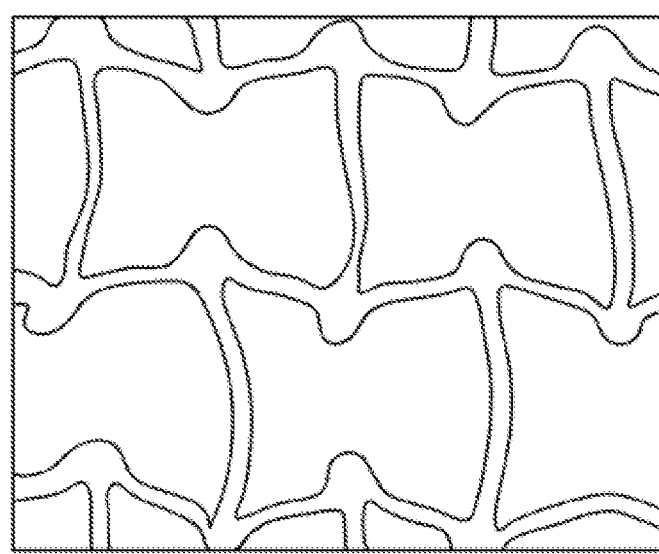
FIG. 5 is an exemplary diagram illustrating deformation of a structure caused by a nonuniform stress distribution according to one embodiment of the present disclosure.

Accordingly, when the stretchable substrate 100 is stretched, as shown in FIG. 5, a deformation deviation may occur in the entire substrate, which may cause distortion. That is, in the case of a stretchable substrate to which mechanical metamaterials having the same structure in the entire region of the substrate are introduced, a difference in degree of structural deformation appears due to spatially induced stress deviation during stretching. This may cause a decrease in the Poisson's ratio control effect due to the introduction of a mechanical metamaterial (for example, an auxetic) and may cause image distortion problems in a variable type display, in particular, a large-area display.

Additionally, there is a concern that the performance of display-related elements disposed adjacent to a surface of a substrate may also be affected. Thus, there is a concern that the mechanical separation of an element positioned on a stretchable substrate may be accelerated and shorten a lifetime of the element. In particular, when the performance of an element is directly affected by a surface shape as in a display or a solar cell, a solution to a corresponding issue may be required.

As described above, in order to prevent the problem of nonuniform deformation of a substrate due to a different induced stress distribution that occurs at each reference point of a stretching point during stretching of a stretchable substrate into which a mechanical metamaterial, that is, an auxetic, is introduced, the present disclosure is directed to providing a stretchable substrate 100 having improved stretching deformation uniformity through control of a spatial crosslinking degree.

Hereinafter, each component of a stretchable substrate having improved stretching deformation uniformity through control of a spatial crosslinking degree and a method of manufacturing the same will be described in detail with reference to FIGS. 6 to 14.

Figure 6:
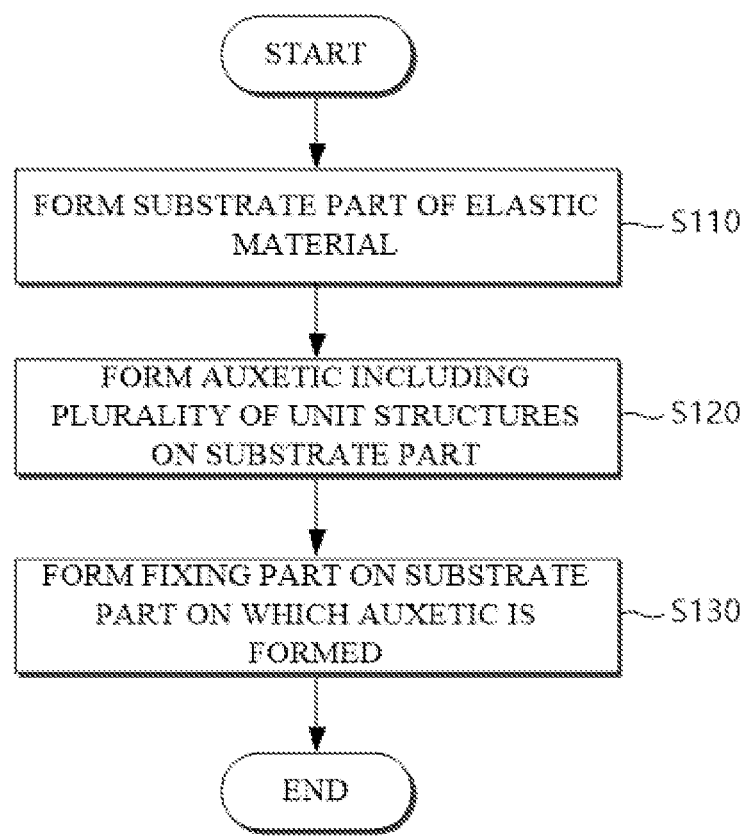
FIG. 6 is an exemplary flowchart for manufacturing a stretchable substrate having improved stretching deformation uniformity through control of a spatial crosslinking degree according to one embodiment of the present disclosure.

FIG. 6 is an exemplary flowchart for manufacturing a stretchable substrate having improved stretching deformation uniformity through control of a spatial crosslinking degree according to one embodiment of the present disclosure. The order of operations shown in FIG. 6 may be changed as needed, and at least one operation may be omitted or added. That is, the operations of FIG. 6 are merely one embodiment of the present disclosure, and the scope of the present disclosure is not limited thereto.

According to one embodiment of the present disclosure, a method of manufacturing a stretchable substrate having improved stretching deformation uniformity through control of a spatial crosslinking degree may include forming a substrate part 10 of an elastic material (S110).

Figure 7:
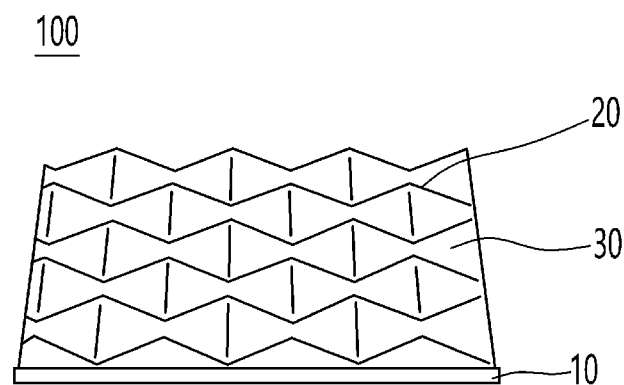
FIG. 7 is an exemplary diagram illustrating a stretchable substrate having improved stretching deformation uniformity through control of a spatial crosslinking degree according to one embodiment of the present disclosure.

The substrate part 10 may be provided to support an auxetic 20 in a process of forming the auxetic 20 and may be provided in the shape of a thin film as shown in FIG. 7. In addition, the substrate part 10 may be made of an elastic material having an elastic force. For example, the substrate part 10 may be made of an elastic material such as PDMS, TPU, VHB™ tape, or butyl rubber which has an elastic modulus that is greater than or equal to a preset reference value. The detailed description of the above-described substrate part is merely an example, and the present disclosure is not limited thereto. The substrate part 10 may be used as an elastic film for supporting the auxetic 20 in a process of forming the auxetic 20 and may form a lower surface of the stretchable substrate 100.

According to one embodiment of the present disclosure, the method of manufacturing a stretchable substrate having improved stretching deformation uniformity through control of a spatial crosslinking degree may include forming the auxetic including a plurality of unit structures on the substrate part 10 (S120).

According to an embodiment, the auxetic 20 may be made of a material having higher strength than the substrate part 10. The auxetic 20 may be provided to have a Young's modulus that is higher than a Young's modulus of the substrate part 10. Since the auxetic 20 is provided to have a higher Young's modulus than the substrate part 10, the auxetic 2 may have a great effect on the deformation of the substrate part 10.

Since the stretchable substrate 100 including the substrate part 10 and the auxetic 20 is greatly affected by the deformation of the auxetic 20 having relatively high strength, the stretchable substrate 100 may be provided to have a negative Poisson's ratio. A Poisson's ratio of a substrate related to the present disclosure can be reduced through such strength of the auxetic, and the substrate can be stretched in various axial directions.

Since the stretchable substrate 100 of the present disclosure includes the plurality of unit structures having a specific shape, in response to an external force generated along one axis, deformation in another axial direction may be caused. For example, one axis along which an external force is generated may be a transverse axis, and another axis may be a longitudinal axis in a vertical direction on the same plane as the axis along which the external force is generated. As a detailed example, when one axis is an x-axis based on a two-dimensional plane, another axis may be a y-axis.

According to an embodiment, an auxetic structure of the present disclosure may include a re-entrant structure, a rotating unit structure, and a chiral structure, but the present disclosure is not limited thereto. As an example, as shown in FIGS. 1 to 5, the auxetic may be formed through a plurality of unit structures having a re-entrant shape.

For example, as shown in FIG. 2, each of the plurality of unit structures may have a bowtie shape. When an external force is applied to the auxetic 20 in a longitudinal direction (that is, when the auxetic is stretched in one direction), as each of the plurality of unit structures unfolds, internal stress acts in a transverse direction, and thus the auxetic 20 may have a negative Poisson's ratio. In response to an external force along a longitudinal axis, the auxetic 20 may be stretched along a transverse axis. In other words, in the auxetic 20, since each of the plurality of unit structures provided therein is implemented through a bowtie shape, when an external force is applied along an axis in one direction, a strain along an axis in another direction may be controlled.

That is, the stretchable substrate 100 implemented through the auxetic 20 may be a substrate to which unique mechanical properties that do not exist in nature are given by using a new structure. The stretchable substrate 100 may have high applicability in various fields. For example, the stretchable substrate 100 of the present disclosure may be applied to a flexible device, a wearable device, or the like and used to maintain electrical or physical properties of an element against external stress. As another example, when the stretchable substrate 100 of the present disclosure is used in the field of displays, the stretchable substrate 100 may support deformation in multidimensional axis directions under various conditions, breaking away from fixed displays that fold or roll in a single direction. Thus, higher variability may be provided to improve a degree of freedom in design and also secure mechanical stability against an external force.

In an embodiment, a distance or height by which the auxetic 20 is inserted may be controlled through a corresponding printing process. Thus, when the stretchable substrate 100 manufactured through a corresponding process is stretched, it is possible to control a strain in relation to one axis or another axis in a direction perpendicular to one axis. That is, the auxetic 20 of the present disclosure may control a strain related to another axis based on an interval between the plurality of unit structures or a thickness of each of the plurality of unit structures. The interval between the plurality of unit structures may be a distance between the unit structures or a size of each of the unit structures. For example, the interval between the plurality of unit structures being short may mean that the size of each of the unit structures is relatively small such that the plurality of unit structures are formed at narrow distances. That is, the interval between the unit structures may be inversely proportional to the number of unit structures included per unit area. In other words, the interval between the unit structures being long may mean that the number of unit structures per unit area is small, and the interval between the unit structures being short may mean that the number of unit structures per unit area is large. Also, the thickness of each of the plurality of unit structures may be the thickness or depth of each of the unit structures in the stretchable substrate 100.

Specifically, in response to an external force generated along one axis, a strain caused along another axis may be determined. Also, the interval between the plurality of unit structures or the thickness of the plurality of unit structures may be determined based on the determined strain. Also, the auxetic may be formed by performing a printing process corresponding to the interval or thickness.

That is, the interval between the plurality of unit structures included in the auxetic 20 or the thickness of the plurality of unit structures may be associated with control of a strain related to another axis. For example, when the interval between the plurality of unit structures included in the auxetic 20 is short, the strain related to another axis may be greater. In addition, when the interval between the plurality of unit structures included in the auxetic 20 is long, the strain related to another axis may be smaller.

That is, when the interval between the plurality of unit structures is relatively short, the number of unit structures per unit area may be relatively large. Thus, when an external force related to one axial direction is generated, a strain along another axis may be greater. For example, when an external force is generated along a transverse axis (for example, an x-axis) in the auxetic 20 in which the interval between the plurality of unit structures is relatively short, deformation (for example, relatively large mechanical deformation) corresponding to the number of unit structures may be generated along a longitudinal axis (for example, the y-axis) in a direction perpendicular to the axis along which the external force is generated. On the other hand, when the interval between the plurality of unit structures is relatively long, the number of unit structures per unit area may be relatively small. Thus, when a tensile force is generated along one axis, a strain along another axis may be smaller. In addition, for example, when an external force is generated along a transverse axis (for example, an x-axis) in the auxetic 20 in which the interval between the plurality of unit structures is relatively long, deformation (for example, relatively small mechanical deformation) corresponding to the number of unit structures may be generated along the longitudinal axis (for example, the y-axis) in a direction perpendicular to the axis along which the external force is generated Also, when the thickness of the auxetic 20 is large, a strain related to another axis may be greater. In addition, when the thickness of the auxetic 20 is small, a strain related to another axis may be smaller.

In other words, according to the present disclosure, in response to an external force generated along one axis, it is possible to control a degree of deformation (that is, a strain) generated along another axis by determining the interval between the plurality of unit structures or the thickness of each of the plurality of unit structures differently during a printing process of forming the auxetic 20.

For example, when the stretchable substrate 100 including the auxetic 20 is used in the field of displays, deformation in another axial direction corresponding to an external force generated along one axis may cause distortion of a screen of a stretchable display. Accordingly, there is a need for the stretchable substrate 100 having a small strain in another axial direction in response to an external force generated along one axis. In this case, according to the present disclosure, during a processing process, the interval between the plurality of unit structures is determined to be short, or the thickness of each of the plurality of unit structures is determined to be large, thereby controlling a strain generated along another axis. That is, the stretchable substrate 100 of the present disclosure may be manufactured through the interval between the plurality of unit structures or the thickness of the plurality of unit structures according to the needs of a user and thus may be a substrate allowing a strain generated along another axis to be controllable.

In an additional embodiment, the stretchable substrate 100 may include an auxetic 20 having one or more partitioned regions, and unit structures with different intervals or thicknesses may each be formed to correspond to one of the partitioned regions. In this case, the one or more partitioned regions may be regions partitioned based on an arrangement of elements associated with the stretchable substrate 100. For example, a region of the stretchable substrate 100 in which many associated elements are expected to be arranged may include unit structures having a different interval or thickness from other regions. That is, unit structures having a different interval or thickness from other regions are formed in a region expected to be most affected by a strain due to the intensive arrangement of elements, thereby controlling a strain to provide an effect of securing connection stability to the elements. For example, in a region in which elements are intensively disposed, the interval between the plurality of unit structures is determined to be short, or the thickness of the plurality of unit structures is determined to be large, thereby minimizing a strain.

That is, a printing process using an elastic material may be performed on an upper portion of the substrate part 10 to form the auxetic 20. In other words, by using the substrate part 10 as a support, a plurality of unit structures having a specific shape may be formed (stacked) on the upper portion through a printing process using an elastic material, thereby forming the auxetic 20. In this case, the interval or thickness of the plurality of unit structures constituting the auxetic 20 may be determined based on a strain, which is to be controlled as described above, related to another axial direction.

According to an embodiment, the substrate part 10 and the auxetic 20 may include the same elastic material. For example, the stretchable substrate 100 of the present disclosure may be used in the field of displays. When the auxetic 20 and the substrate part 10 constituting the stretchable substrate 100 are made of different materials under these use conditions, a difference in refractive index between the auxetic 20 and the substrate part 10 occurs, and thus there is a concern that the resolution of a displayed screen may be insufficient. For example, when the substrate part 10 and the auxetic 20 are made of different materials, a difference in refractive index between the materials occurs, and thus an aspect of the auxetic formed on the substrate part 10 may be exposed, which may make it difficult to secure visibility.

Accordingly, the auxetic 20 and the substrate part 10 of the stretchable substrate 100 of the present disclosure may include the same material. For example, when the auxetic 20 includes a mechanical metamaterial of PDMS, the substrate part 10 coupled to the auxetic 20 may include the same PDMS material. That is, a difference in refractive index between the auxetic 20 and the substrate part 10 is minimized to secure transparency, thereby providing the stretchable substrate 100 with improved visibility in the field of display applications. Therefore, the stretchable substrate 100 of the present disclosure is manufactured in consideration of a refractive index between materials, thereby providing improved transparency. Also, since the auxetic 20 and the substrate part 10 are made of the same material, adhesion can be improved upon coupling or impregnation between materials, thereby securing stability and durability. The detailed description of the above-described material constituting the auxetic and the substrate part is merely an example, and the present disclosure is not limited thereto.

In an embodiment, the auxetic 20 and the substrate part 10 are made of the same material, and different curing processes are performed such that the auxetic 20 and the substrate part 10 have different Young's moduli, that is, different mechanical strengths.

In a specific embodiment, in the case of the auxetic 20, a ratio of a curing agent to an elastic material is increased, and curing is performed at a high temperature for a long time, thereby increasing mechanical strength. In the case of the substrate part 10, a ratio of a curing agent to an elastic material is decreased, and curing is performed at a low temperature for a short time, thereby decreasing mechanical strength.

According to one embodiment of the present disclosure, the method of manufacturing a stretchable substrate having improved stretching deformation uniformity through control of a spatial crosslinking degree may include forming a fixing part 30 on the substrate part 10 on which the auxetic 20 is formed (S130).

According to an embodiment, the fixing part 30 may be formed by coating the substrate part 10, on which the auxetic 20 is formed, with a filler in a liquid state, and curing the filler. As the filler in a liquid state is cured, the fixing part 30 for fixing the auxetic 20 is formed. In an embodiment, the filler for forming the fixing part 30 may be an elastomer which is a high molecular material exhibiting rubber elasticity at room temperature. The elastomer may include a thermosetting elastomer cured by heat and a photocurable elastomer cured by light.

That is, as shown in FIG. 7, since the substrate part 10 is provided in the shape of a thin film, a lower surface of the entire stretchable substrate 100 may be formed, and the auxetic 20 may be printed on one surface of the corresponding substrate part 10 to have a specific thickness. After the auxetic 20 is printed on the one surface of the substrate part 10 to have a specific thickness, the corresponding substrate part 10 may be coated with the filler in a liquid state, and curing may be performed to form the fixing part 30.

In an embodiment, the auxetic 20 may be made of a material having higher strength than the fixing part 30. The auxetic 20 may be provided to have a Young's modulus that is higher than a Young's modulus of the fixing part 30. That is, since the auxetic 20 is provided to have a higher Young's modulus than the substrate part 10 and the fixing part 30, the deformation of the auxetic 20 may have a great effect on the deformation of the entire stretchable substrate 100.

Since the stretchable substrate 100 including the substrate part 10, the auxetic 20, and the fixing part 30 is greatly affected by the deformation of the auxetic 20 having relatively high strength, the stretchable substrate 100 may be provided to have a negative Poisson's ratio. In other words, in the case of the substrate part 10 and the fixing part 30, when the auxetic 20 is deformed to implement a negative Poisson's ratio, it is preferable that the substrate part 10 and the fixing part 30 have lower mechanical strength than the auxetic 20 so as not to have a significant effect on mechanical deformation for implementing the negative Poisson's ratio.

Meanwhile, as described above, when the stretchable substrate 100 is stretched in one direction, nonuniform stress may be applied according to a position thereof on the substrate at which each unit structure is provided. For example, when an external force for stretching is applied, unit structures positioned at an edge are easily stretched, but unit structures positioned at a central portion may not completely receive a force and thus may be less easily stretched. When both end portions of the substrate are held and stretched, stress transferred to each position of the unit structures may be different, and thus a degree of unfolding may be different for each unit structure.

In other words, since induced stress is nonuniform in each region of the substrate, stretching may also be nonuniformly generated. That is, stress with a different magnitude is induced at each position due to a stress tailoring effect. Under the same external stress condition, stress with a smaller magnitude is induced in a direction away from a stretching point, which is influenced by the stretching point and an area of the substrate or mechanical properties.

In the present disclosure, in order to prevent a degree of deformation from being different for each region due to the induction of nonuniform stress according to a stretching point, the fixing part 30 is formed to have a different crosslinking density for each region. Since the crosslinking density of the fixing part 30 affects a strain of the auxetic 20, when the crosslinking density of the fixing part 30 for each region is provided differently, the auxetic 20 fixed through the fixing part 30 also has a different strain in each region.

In an embodiment, the fixing part 30 is provided to have a different crosslinking density in each region corresponding to one specific region. Here, the specific region may be a region in which stress is concentrated during stretching and may be a region (for example, an intersection region) in which three sides intersect each other in each unit structure. A reason why the fixing part has a different crosslinking density for each region of the substrate is to make stress applied to each region of the substrate uniform during stretching. For example, a crosslinking density of the fixing part corresponding to each of the above-described specific regions is controlled differently for each region, thereby uniformly controlling stress applied to each region of the substrate during stretching. That is, by making a curing process of the filled filler corresponding to the specific region different from that of other regions, the crosslinking density of the formed fixing part 30 is controlled to be different from that of other regions, thereby uniformly controlling stress applied to each region.

In a specific embodiment, according to the present disclosure, the stretchable substrate 100 can be designed to have a different crosslinking density in each region through the introduction of various substrate spatial crosslinking density control processes according to a used elastomer material. For example, in a region in which the auxetic is to be more easily deformed, the fixing part is formed through a low crosslinking density, and in region (for example, a specific region) in which the auxetic is to be more firmly maintained, the fixing part may be formed through a high crosslinking density. For example, the fixing part 30 may be designed such that a crosslinking density is low in a central region and gradually increases toward an edge region, thereby implementing the stretchable substrate 100.

Accordingly, when the stretchable substrate 100 of the present disclosure is stretched, it is possible to control induced stress of the substrate and implement uniform deformation. For example, a degree of stretching of each region (that is, a degree of mechanical deformation) may be different according to a crosslinking density, and induced stress may be uniformly applied to the entire substrate during stretching. Hereinafter, a process of controlling a crosslinking density of each region of a substrate in various ways according to a used elastomer material will be described in detail with reference to FIGS. 8 to 14.

According to one embodiment of the present disclosure, in the forming of the fixing part 30, the substrate part 10, on which the auxetic 20 is formed, is coated with the filler in a liquid state, and curing is performed. The filler may be photocured by transmitted light.

The fixing part 30 formed through the curing may be formed on the auxetic 20 and the substrate part 10 to fix the auxetic 20 and the substrate part 10 and may constitute an upper surface of the stretchable substrate 100.

In this case, the filler may be a photocurable elastomer, and curing performed on the filler may be performed through a different light irradiation pattern for each region.

Figure 8:
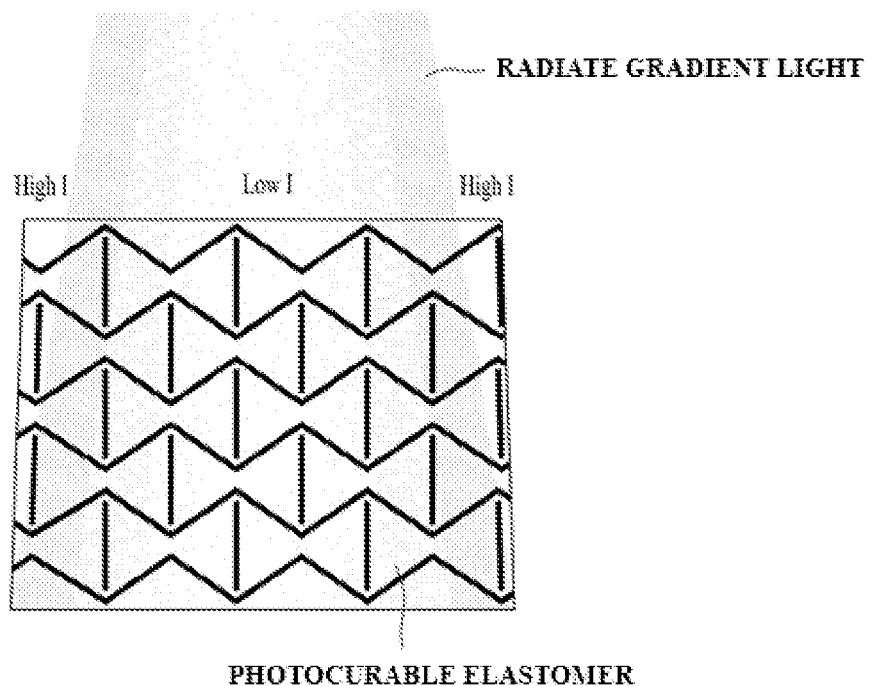
FIG. 8 is an exemplary diagram illustrating a method of manufacturing a stretchable substrate having improved stretching deformation uniformity through control of a spatial crosslinking degree according to one embodiment of the present disclosure.

According to a specific embodiment, as shown in FIG. 8, photocuring may be performed through a different light irradiation pattern for each region in a state of being coated with the filler. Gradient light may be radiated in a state in which the substrate part 10, on which the auxetic 20 is formed, is coated with the filler. More specifically, light having low intensity may be radiated onto a central region, and light intensity may gradually increase toward an edge. In an embodiment, a photocurable elastomer may be cured differently according to intensity of light, and thus a crosslinking density may be different. For example, a region in which light intensity is high (for example, an edge region) may be cured to have a high crosslinking density. A region in which light intensity is relatively low (for example, a central region) may be cured to have a low crosslinking density.

That is, in the present disclosure, in a process of forming a fixing part using a photocurable filler, a crosslinking density may be controlled at each position of a substrate through control of a light pattern for supplying light having different intensity for each region. Specifically, light having low intensity may be supplied to a central region to decrease a crosslinking density, and light having high intensity may be supplied to an edge region to increase a crosslinking density. In an embodiment, an increase in crosslinking density may consequently mean an increase in mechanical strength of a corresponding region.

As described above, a crosslinking density of the fixing part for each region can be controlled to be different through a process of controlling a light pattern, and thus the stretchable substrate 100 may be implemented such that stress induced in the entire substrate is uniform. In other words, when the substrate is stretched, it is possible to uniformly deform the entire substrate instead of performing stretching differently for each region.

Figure 9:
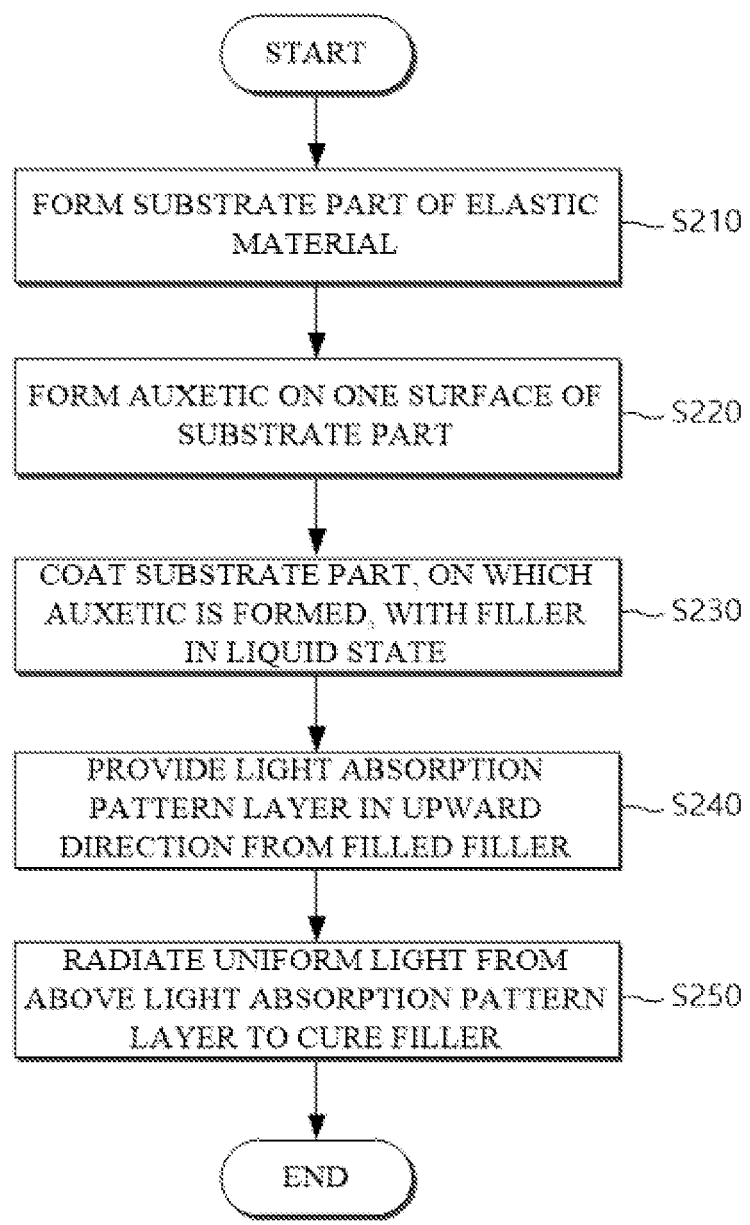
FIG. 9 is an exemplary flowchart for manufacturing a stretchable substrate having improved stretching deformation uniformity through control of a spatial crosslinking degree according to one embodiment of the present disclosure.
Figure 10:
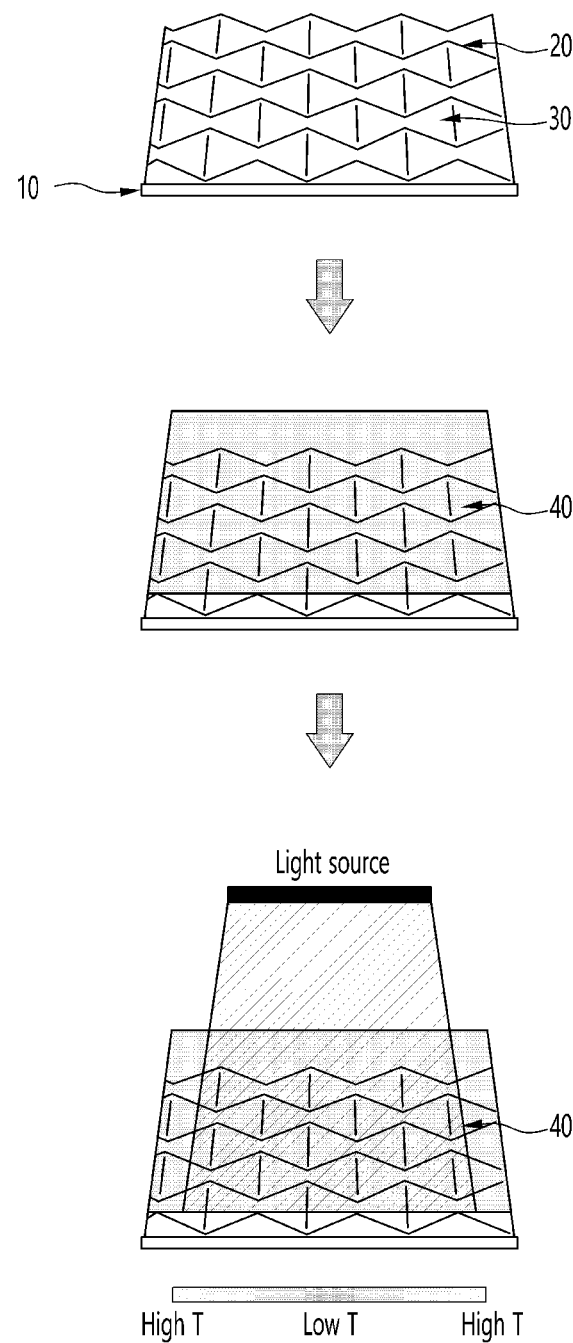
FIG. 10 shows exemplary diagrams illustrating processes of manufacturing a stretchable substrate having improved stretching deformation uniformity through control of a spatial crosslinking degree according to one embodiment of the present disclosure.

FIG. 9 is an exemplary flowchart for manufacturing a stretchable substrate having improved stretching deformation uniformity through control of a spatial crosslinking degree according to one embodiment of the present disclosure. The order of operations shown in FIG. 9 may be changed as needed, and at least one operation may be omitted or added. The content described with reference to FIGS. 6 to 8 can be referenced for the features that overlap the features described above with reference to FIGS. 6 to 8 among the features of the content shown in FIG. 9, and description thereof will be omitted here According to one embodiment of the present disclosure, a method of manufacturing a stretchable substrate having improved stretching deformation uniformity through control of a spatial crosslinking degree may include forming a substrate part 10 of an elastic material (S210). Referring to FIG. 10, a substrate part 10 is provided in the shape of a thin film to form a lower surface of a stretchable substrate 100 and support an auxetic 20 and a fixing part 30.

According to one embodiment of the present disclosure, the method of manufacturing a stretchable substrate having improved stretching deformation uniformity through control of a spatial crosslinking degree may include forming the auxetic 20 on one surface of the substrate part 10 (S220). The auxetic 20 is stacked and formed to have a certain thickness (or height) in an upward direction from the substrate part 10 having the shape of a thin film.

According to one embodiment of the present disclosure, the method of manufacturing a stretchable substrate having improved stretching deformation uniformity through control of a spatial crosslinking degree may include coating the substrate part 10, on which the auxetic 20 is formed, with a filler in a liquid state (S230). In one embodiment, the filler may include a photocurable elastomer. In the case of a photocurable elastomer, a degree of curing may be different according to intensity of light.

According to one embodiment of the present disclosure, the method of manufacturing a stretchable substrate having improved stretching deformation uniformity through control of a spatial crosslinking degree may include providing a light absorption pattern layer 40 in an upward direction from the filled filler (S240).

According to one embodiment of the present disclosure, the method of manufacturing a stretchable substrate having improved stretching deformation uniformity through control of a spatial crosslinking degree may include radiating uniform light from above the light absorption pattern layer 40 to cure the filler (S250).

In an embodiment, the light absorption pattern layer 40 may have a different light absorption pattern for each region. For example, in general, the stretchable substrate 100 is expanded or stretched using an end region as a stretching point. When the substrate is stretched in the end region, as described above, stress is induced around each of unit structures positioned at the end region, and stress induced in unit structures positioned at a central region is decreased. Accordingly, in the present disclosure, the light absorption pattern layer 40 having a pattern in which a light absorption rate increases in a direction away from a central region may be provided to form the fixing part 30 to have a different crosslinking degree in each region. That is, in a state in which the light absorption pattern layer 40 is provided on the substrate part 10, light may be radiated to perform photocuring, thereby forming the fixing part 30.

Specifically, as shown in FIG. 10, even when uniform light is supplied from above, an amount of light transmitted to the filler may be varied by the light absorption pattern layer 40. A relatively small amount of light is transmitted to a central region through the light absorption pattern layer 40, and an amount of transmitted light is increased in a direction away from the central region. Accordingly, photocuring through the filler, that is, the photocurable elastomer, becomes more active in the direction away from the central region so that mechanical strength increases in the direction way from the central region. That is, in a state in which the substrate part 10, on which the auxetic 20 is formed, is coated with the filler, different light is transmitted to each region through the light absorption pattern layer so that the fixing part 30 has a different crosslinking density in each region of the substrate. In this case, the crosslinking density increases in the direction away from the central region, and an increase in crosslinking density consequently means that mechanical strength increases.

Accordingly, when a substrate is stretched using an end region as a stretching point, the deformation of an auxetic corresponding to a central region, which has relatively low mechanical strength, may first occur, and the deformation may gradually propagate toward a region away from a center so that uniform induced stress may be induced in the entire substrate. Thus, there are advantages in that uniform stretching deformation is caused in the entire substrate to minimize the distortion of an image and improve the arrangement stability of elements adjacent to a surface.

Figure 11:
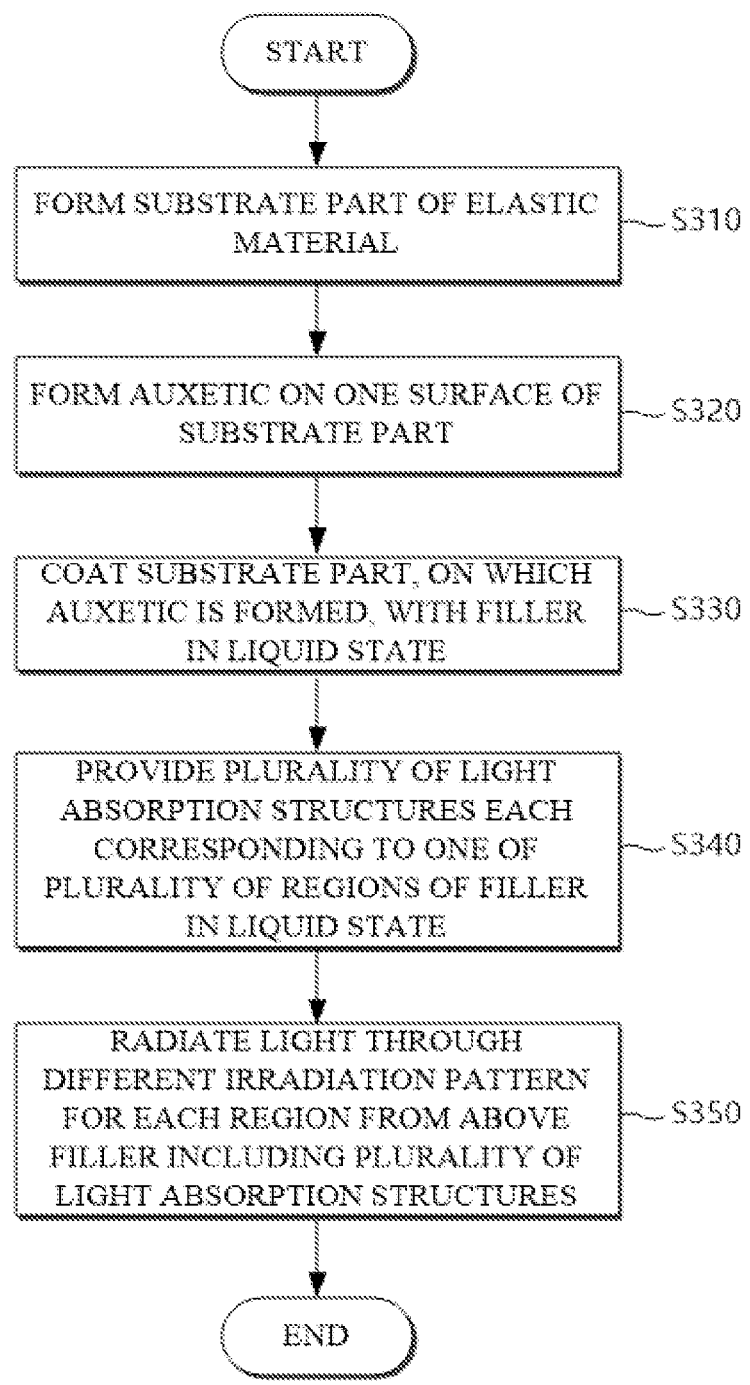
FIG. 11 is an exemplary flowchart for manufacturing a stretchable substrate having improved stretching deformation uniformity through control of a spatial crosslinking degree according to another embodiment of the present disclosure.

FIG. 11 is an exemplary flowchart for manufacturing a stretchable substrate having improved stretching deformation uniformity through control of a spatial crosslinking degree according to another embodiment of the present disclosure. The order of operations shown in FIG. 11 may be changed as needed, and at least one operation may be omitted or added. The content described with reference to FIGS. 6 to 10 can be referenced for the features that overlap the features described above with reference to FIGS. 6 to 10 among the features of the content shown in FIG. 11, and description thereof will be omitted here.

According to another embodiment of the present disclosure, a method of manufacturing a stretchable substrate having improved stretching deformation uniformity through control of a spatial crosslinking degree may include forming a substrate part 10 of an elastic material (S310).

According to another embodiment of the present disclosure, the method of manufacturing a stretchable substrate having improved stretching deformation uniformity through control of a spatial crosslinking degree may include forming an auxetic 20 on one surface of the substrate part 10 (S320).

According to another embodiment of the present disclosure, the method of manufacturing a stretchable substrate having improved stretching deformation uniformity through control of a spatial crosslinking degree may include coating the substrate part 10, on which the auxetic 20 is formed, with a filler in a liquid state (S330). According to an embodiment, the filler used to form the fixing part 30 may include an elastomer related to thermosetting. That is, the filler may be cured by transferred heat.

According to another embodiment of the present disclosure, the method of manufacturing a stretchable substrate having improved stretching deformation uniformity through control of a spatial crosslinking degree may include providing a plurality of light absorption structures 50 each corresponding to one of a plurality of regions of the filler in a liquid state (S340).

Each of the plurality of light absorption structures 50 may be provided to correspond to one region to absorb light. As an amount of light absorbed through the light absorption structure increases, a curing temperature may increase, and in this case, a crosslinking density of a corresponding region increases. An increase in crosslinking density may consequently mean an increase in mechanical strength of a corresponding region.

Figure 12:
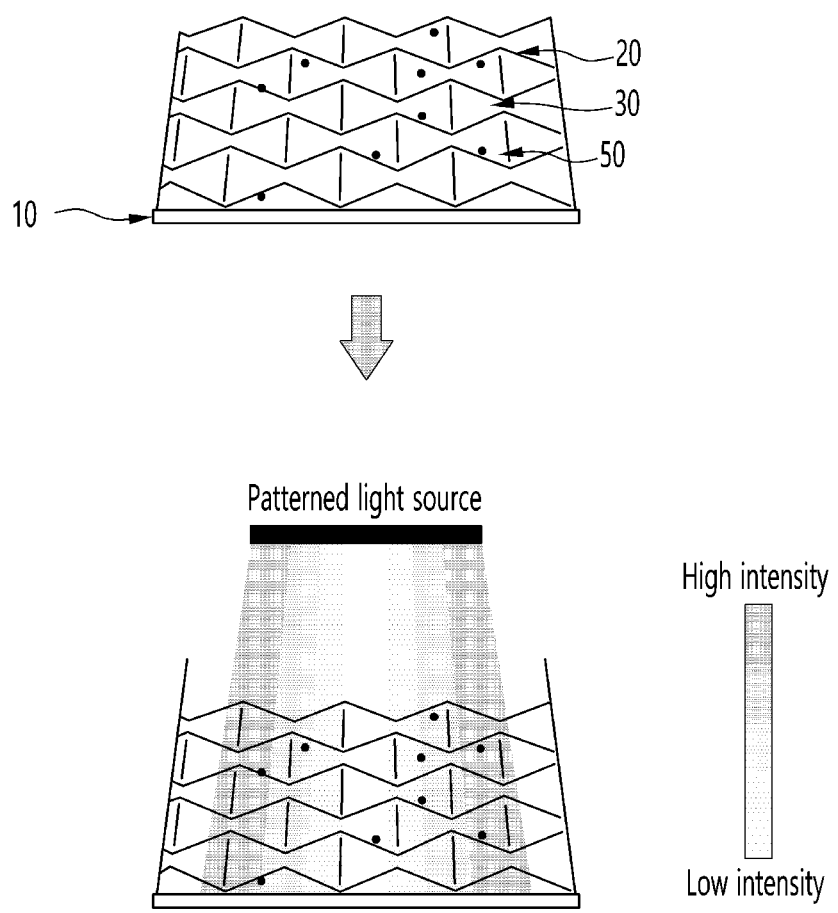
FIG. 12 shows exemplary diagrams illustrating processes of manufacturing a stretchable substrate having improved stretching deformation uniformity through control of a spatial crosslinking degree according to another embodiment of the present disclosure.

As shown in FIG. 12, the plurality of light absorption structures 50 may be provided to correspond to regions of which mechanical strength is to be increased. The fixing part 30, which is formed to correspond to the region in which the light absorption structure 50 is positioned, may have relatively higher mechanical strength than a region in which the light absorption structure 50 is not provided. For example, a region in which curing is performed in a state in which the plurality of light absorption structures 50 are present may have higher mechanical strength than a region in which curing is performed in a state in which no light absorption structure 50 is present.

In an embodiment, the plurality of light absorption structures 50 may each be provided to correspond to a specific region of one unit structure. Here, the specific region may relate to a region in which stress is concentrated during stretching and may be a region (for example, an intersection region) in which three sides intersect each other in each unit structure. Each of the plurality of light absorption structures 50 may be included in the filler corresponding to an intersection region of each unit structure.

In various embodiments, the plurality of light absorption structures 50 may be provided in the specific region of each unit structure, and a different number of light absorption structures 50 may be provided at each position of the unit structures in the substrate. As an example, one light absorption structure 50 may be provided to correspond to an intersection region of a first unit structure positioned in a central region of the substrate, and two light absorption structures may be provided to correspond to an intersection region of a second unit structure spaced a certain distance apart from a center of the substrate. Also, in an embodiment, three light absorption structures may be provided to correspond to an intersection region of a third unit structure further away from the central region than the second unit structure. That is, the light absorption structure 50 is provided to correspond to the certain region of each unit structure, and each unit structure may be provided to include more light absorption structures as a distance from the central region increases. A reason why a different number of light absorption structures 50 are provided for each region is to vary an amount of light transmitted to each region. When an amount of light transmitted to each region is different, a degree of curing through light is different. As a result, stress induced in accordance with the entire substrate can be uniformly provided through control of a crosslinking degree for each region.

According to another embodiment of the present disclosure, the method of manufacturing a stretchable substrate having improved stretching deformation uniformity through control of a spatial crosslinking degree may include radiating light through a different irradiation pattern for each region from above the filler including the plurality of light absorption structures (S350).

That is, light having a different irradiation pattern is radiated to each region from above the filler in a liquid state including the plurality of light absorption structures each corresponding to one of the plurality of regions, thereby forming the fixing part 30.

More specifically, referring to FIG. 12, in a state in which the auxetic 20 is filled with the filler, each of the plurality of light absorption structures may be positioned in each region of the filler, and gradient light may be radiated from above the corresponding filler. More specifically, light having low intensity may be radiated onto a central region, and light intensity may gradually increase toward an edge. In an embodiment, a thermosetting elastomer may be cured differently according to a temperature, and a crosslinking density may be different according to a degree of curing. For example, due to a high temperature, a region in which light intensity is high (for example, an edge region) may be cured to have a high crosslinking density. Due to a low temperature, a region in which light intensity is relatively low (for example, a central region) may be cured to have a low crosslinking density.

As described above, according to the present disclosure, a light absorption material may be introduced into a substrate, and a light pattern may be controlled to control a crosslinking density at each position of the substrate. According to the present disclosure, a crosslinking density of each region of a substrate may be determined differently using a plurality of light absorption structures and a different light irradiation pattern for each region. In a specific embodiment, a plurality of light absorption structures are positioned to correspond to a region in which a crosslinking density is to be increased, and curing is performed, thereby determining a different crosslinking density for each region. In addition, in an embodiment, light with different intensity is radiated to each region, thereby determining a different crosslinking density for each region of a substrate. Through such a process method, it is possible to implement a stretchable substrate 100 having uniform stress induced in the entire substrate. In other words, a uniform Poisson's ratio may be controlled in the overall aspect of a substrate.

Figure 13:
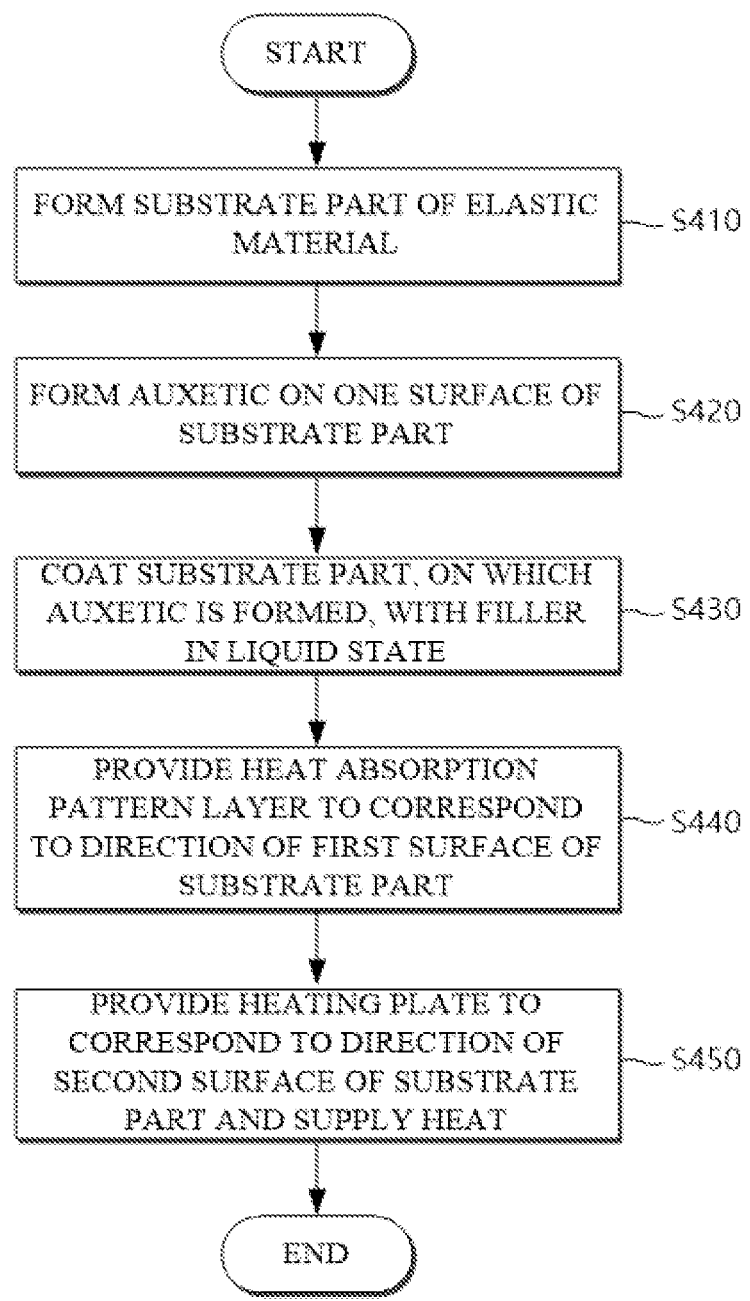
FIG. 13 is an exemplary flowchart for manufacturing a stretchable substrate having improved stretching deformation uniformity through control of a spatial crosslinking degree according to still another embodiment of the present disclosure.

FIG. 13 is an exemplary flowchart for manufacturing a stretchable substrate having improved stretching deformation uniformity through control of a spatial crosslinking degree according to still another embodiment of the present disclosure. The order of operations shown in FIG. 13 may be changed as needed, and at least one operation may be omitted or added. The content described with reference to FIGS. 6 to 12 can be referenced for the features that overlap the features described above with reference to FIGS. 6 to 12 among the features of the content shown in FIG. 13, and description thereof will be omitted here.

According to still another embodiment of the present disclosure, a method of manufacturing a stretchable substrate having improved stretching deformation uniformity through control of a spatial crosslinking degree may include forming a substrate part 10 of an elastic material (S410).

According to still another embodiment of the present disclosure, the method of manufacturing a stretchable substrate having improved stretching deformation uniformity through control of a spatial crosslinking degree may include forming an auxetic 20 on one surface of the substrate part 10 (S420).

According to still another embodiment of the present disclosure, the method of manufacturing a stretchable substrate having improved stretching deformation uniformity through control of a spatial crosslinking degree may include coating the substrate part 10, on which the auxetic 20 is formed, with a filler in a liquid state (S430). According to an embodiment, the filler used to form the fixing part 30 may include an elastomer related to thermosetting. That is, the filler may be cured by transferred heat.

According to still another embodiment of the present disclosure, the method of manufacturing a stretchable substrate having improved stretching deformation uniformity through control of a spatial crosslinking degree may include providing a heat absorption pattern layer to correspond to a direction of a first surface of the substrate part 10 (S440).

According to still another embodiment of the present disclosure, the method of manufacturing a stretchable substrate having improved stretching deformation uniformity through control of a spatial crosslinking degree may include providing a heating plate to correspond to a direction of a second surface of the substrate part 10 and supplying heat (S450).

That is, in a state in which the heat absorption pattern layer is disposed to correspond to the first surface of the fixing part 30, heat may be supplied through a heating plate 70 disposed to correspond to the second surface of the substrate part 10 to perform thermal curing, thereby forming the fixing part 30.

According to an embodiment, in the present disclosure, a pattern layer with excellent thermal conductivity is introduced onto a surface of a substrate to differently transfer heat such that a temperature is different at each position, thereby controlling a crosslinking density of each region.

In a specific embodiment, a heat absorption pattern layer 60 may be disposed to correspond to the direction of the first surface (for example, an upper surface) of the substrate part 10. In an embodiment, the heat absorption pattern layer 60 may have a different light absorption pattern for each region.

Figure 14:
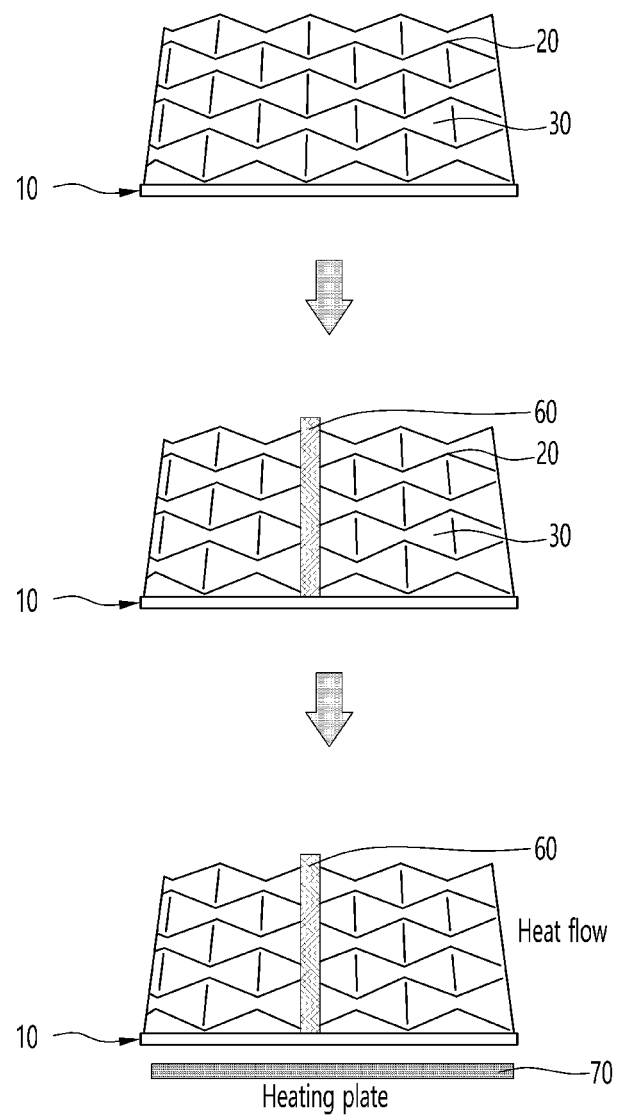
FIG. 14 shows exemplary diagrams illustrating processes of manufacturing a stretchable substrate having improved stretching deformation uniformity through control of a spatial crosslinking degree according to still another embodiment of the present disclosure.

Referring to FIG. 14, the heat absorption pattern layer 60 may be provided in an upward direction from the auxetic 20, and in this case, the heating plate for supplying heat may be provided in a direction toward the second surface (for example, a lower surface) of the substrate part 10. In an embodiment, the heat absorption pattern layer 60 may be provided to correspond to a central region, and thus heat supplied from the heating plate is transferred in the form of heat flow as shown in FIG. 14. That is, heat is supplied in a form in which it is transferred from both edges to the central region. In this case, high-temperature heat may be supplied to both edge regions, and a temperature of the supplied heat may be gradually decreased toward the central region. In other words, a curing temperature in the central region may be minimized and may be increased toward both edge regions.

That is, as shown in FIG. 14, a filler related to thermosetting is supplied toward the upper portion of the auxetic 20 in which a plurality of first regions are formed, and different heat is supplied to each region through the heat absorption pattern layer 60 and the heating plate 70, thereby designing a stretchable substrate 100 to have a different crosslinking density for each region of the substrate. In an embodiment, a crosslinking density increases toward both edge regions, and an increase in crosslinking density may consequently mean an increase in mechanical strength of a corresponding region.

As described above, through thermal curing using the heat absorption pattern layer 60 and the heating plate 70, a crosslinking density of the fixing part 30 for each region may be controlled to be different, and thus the stretchable substrate 100 may be implemented such that stress induced in the entire substrate is uniform. In other words, a uniform Poisson's ratio may be controlled in the overall aspect of a substrate.

According to various embodiments of the present disclosure, by spatially controlling a crosslinking degree of a matrix of a stretchable substrate into which a mechanical metamaterial is introduced, a uniform stress distribution at each position can be induced, thereby controlling uniform stretching deformation of the substrate.

Effects of the present disclosure may not be limited to those described above, and the other unmentioned effects of the present disclosure will become apparent to those skilled in the art from the above description.

Although embodiments of the present disclosure have been described with reference to the accompanying drawings, it should be understood that those skilled in the art can carry out other modifications without changing the technical spirit or essential features of the present disclosure. Therefore, it should be understood that the embodiments described herein are illustrative and not restrictive in all aspects.

Particular implementations described in the present disclosure are exemplary and do not limit the scope of practiced embodiments. For conciseness of the specification, the description of conventional electronic configurations, control systems, software, and other functional aspects of systems may be omitted. Moreover, connections of lines or connecting elements between components shown in the accompanying drawings may represent functional connections and/or physical or circuit connections and may represent various kinds of replaceable or additional functional connections, physical connections, or circuit connections in an actual device. Furthermore, when not specifically described using terms such as "essentially" or "importantly," elements described in the specification may not be necessarily required for application of the present disclosure.

It will be appreciated that a specific order or a hierarchical structure of steps in the presented processes and methods is one example of exemplary approaches. It will be appreciated that the specific order or the hierarchical structure of the steps in the processes within the scope of the present disclosure may be rearranged based on design priorities. Appended method claims provide elements of various steps in a sample order, but this does not mean that the method claims are limited to the presented specific order or hierarchical structure.

The description of the presented embodiments is provided so that those skilled in the art of the present disclosure may use or implement the present disclosure. Various modifications of the embodiments will be apparent to those skilled in the art of the present disclosure, and general principles defined herein can be applied to other embodiments without departing from the scope of the present disclosure. Therefore, the present disclosure is not limited to the embodiments presented herein but should be interpreted within the widest range which is associated with the principles and new features presented herein.

What is claimed is:

1. A method of manufacturing a stretchable substrate having improved stretching deformation uniformity through control of a spatial crosslinking degree, the method comprising:
   forming a substrate part of an elastic material;
   forming an auxetic including a plurality of unit structures on the substrate part; and
   forming a fixing part on the substrate part on which the auxetic is formed,
   wherein the fixing part has a different crosslinking density in each region,
   wherein the forming of the fixing part includes coating the substrate part, on which the auxetic is formed, with a filler in a liquid state, and performing curing.

2. The method of claim 1, wherein the auxetic is provided to have a Young's modulus that is higher than a Young's modulus of the substrate part and a Young's modulus of the fixing part.

3. The method of claim 1, wherein the filler includes a photocurable elastomer, and
   the curing is performed through a different light irradiation pattern for each region.

4. The method of claim 1, wherein the filler includes a thermosetting elastomer, the forming of the fixing part includes providing a light absorption pattern layer in an upward direction from the substrate part, the light absorption pattern layer has a different light absorption pattern for each region, and the curing includes photocuring through uniform light radiation.

5. The method of claim 4, wherein the light absorption pattern layer has a light absorption pattern in which light absorption increases in a direction away from a center.

6. The method of claim 1, wherein the forming of the fixing part includes providing a plurality of light absorption structures each corresponding to one of a plurality of regions of the filler in the liquid state, and radiating light through a different irradiation pattern for each region from above the filler including the plurality of light absorption structures, wherein each of the plurality of light absorption structures is provided to correspond to one region and absorb the light.

7. The method of claim 1, wherein the filler includes a thermosetting elastomer, the forming of the fixing part includes providing a heat absorption pattern layer on one surface of the substrate part, and providing a heating plate on another surface of the substrate part to supply heat, wherein the heat absorption pattern layer has a different heat absorption pattern for each region, and the curing includes thermal curing performed through supply of heat.

8. A stretchable substrate having improved stretching deformation uniformity through control of a spatial crosslinking degree, the stretchable substrate comprising:

a substrate part made of an elastic material;

an auxetic including a plurality of unit structures and formed on one surface of the substrate part; and a fixing part configured to fix the auxetic, wherein the fixing part has a different crosslinking density in each region, wherein the fixing part is formed by coating the substrate part, on which the auxetic is formed, with a filler in a liquid state, and performing curing.

9. The stretchable substrate of claim 8, wherein the auxetic is provided to have a Young's modulus that is higher than a Young's modulus of the substrate part and a Young's modulus of the fixing part.

10. The stretchable substrate of claim 8, wherein the fixing part is formed by radiating light having a different irradiation pattern for each region from above the filler in the liquid state including a plurality of light absorption structures corresponding to each of a plurality of regions, and each of the plurality of light absorption structures is provided to correspond to one region and absorb the light.

11. The stretchable substrate of claim 8, wherein the filler includes a photocurable elastomer, and the curing is performed through a different light irradiation pattern for each region.

12. The stretchable substrate of claim 8, wherein the filler includes a thermosetting elastomer, the fixing part is formed by curing the filler by radiating uniform light in a state in which a light absorption pattern layer is provided in an upward direction from the substrate part, and the light absorption pattern layer has a different light absorption pattern for each region.

13. The stretchable substrate of claim 12, wherein the light absorption pattern layer has a light absorption pattern in which light absorption increases in a direction away from a center.

14. The stretchable substrate of claim 12, wherein the filler includes a thermosetting elastomer, in a state in which a heat absorption pattern layer is disposed to correspond to a first surface of the fixing part, heat is supplied through a heating plate disposed to correspond to a second surface of the substrate part to perform thermal curing and form the fixing part, and the heat absorption pattern layer has a different heat absorption pattern for each region.

* * * * *